June 11, 1935. W. C. KLEINFELDER 2,004,611
FLOW INDICATOR
Filed Sept. 23, 1932 3 Sheets-Sheet 1
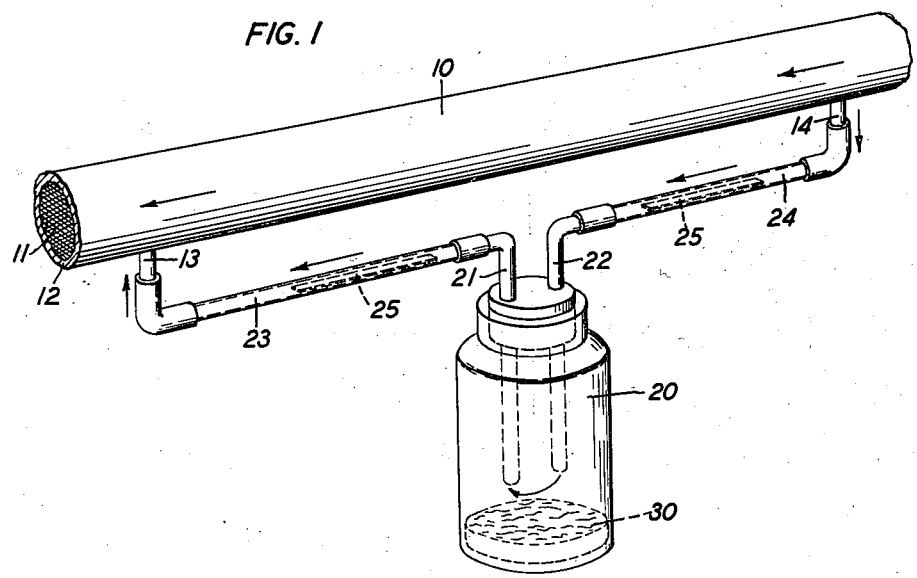
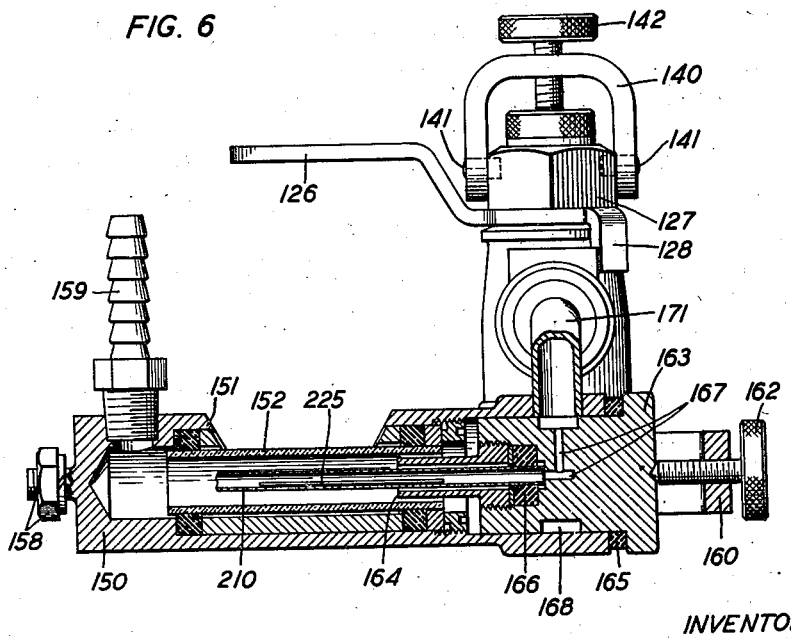
INVENTOR
W. C. KLEINFELDER
BY J. W. Schmied
ATTORNEY June 11, 1935. W. C. KLEINFELDER 2,004,611
FLOW INDICATOR
Filed Sept. 23, 1932 3 Sheets-Sheet 2

INVENTOR
W. C. KLEINFELDER
BY
J. W. Schmied
ATTORNEY

June 11, 1935.     W. C. KLEINFELDER     2,004,611
FLOW INDICATOR
Filed Sept. 23, 1932     3 Sheets-Sheet 3
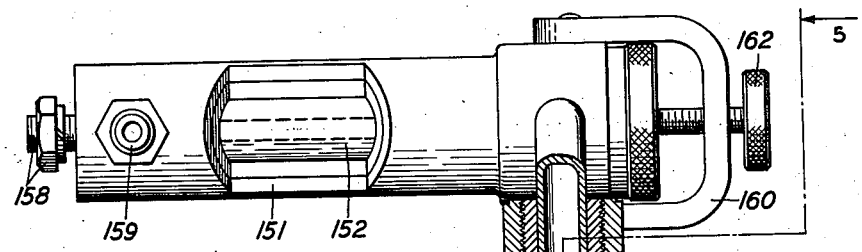
FIG. 4
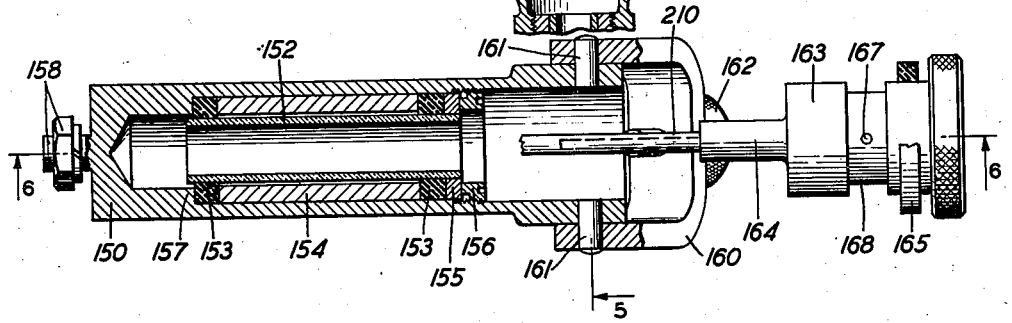
FIG. 7
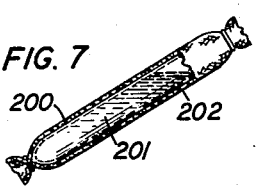
FIG. 8
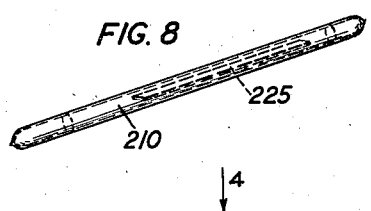
FIG. 5
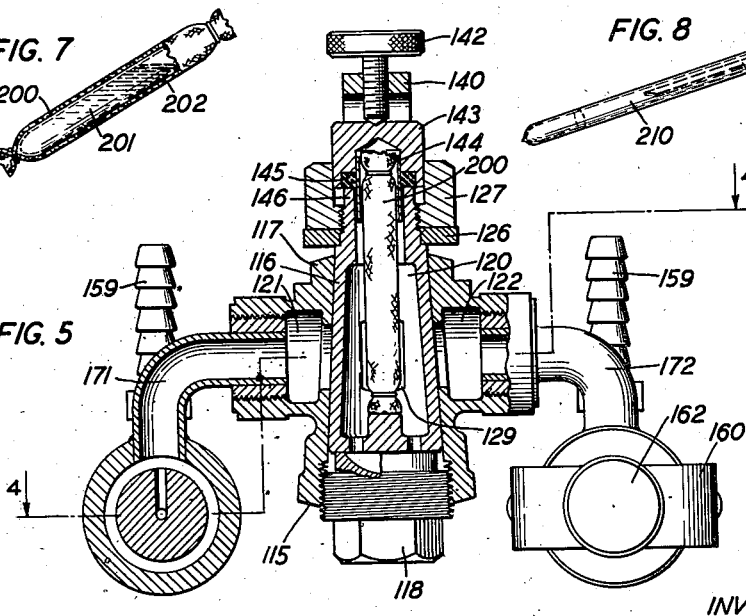
INVENTOR
W. C. KLEINFELDER
BY
J. W. Schmied
ATTORNEY Patented June 11, 1935

2,004,611

UNITED STATES PATENT OFFICE 2,004,611

FLOW INDICATOR

Walter C. Kleinfelder, Rosebank, N. Y., assignor to Bell Telephone Laboratories, Incorporated, New York, N. Y., a corporation of New York Application September 23, 1932, Serial No. 634,571

17 Claims. (Cl. 23—230)

This invention relates to flow indicators and more particularly to indicators of this type for the determination of gas flow in gas-filled tubes or pipes.

The invention is particularly applicable to methods of detecting leaks in the hermetic lead covering of multi-conductor signalling cables.

In modern practice of operating telephone cables, which consist of paper and air insulated conductors surrounded by a hermetic sheathing of lead for the exclusion of moisture, the cable is filled with an inert gas, such as nitrogen, under a pressure of approximately 12 pounds per square inch; some of the objects of this practice are to prevent moisture from entering through an accidental leak in the sheathing and to provide a means for detecting such leaks, namely, by observing reductions in the gas pressure.

The exact location of a leak presents an important problem, particularly in the case of underground cables which form a large proportion of the present day telephone system. In case of repairs the choice is between digging down to the leak to stop it, and replacing the cable portion between manholes in which the leak is located; in either case it is quite essential that the location of the leak be very definitely determined by observations made at points of access, such as the manholes.

Various methods have been suggested for this purpose but difficulties have been encountered with them due to the slowness of the gas flow in the cables.

The present invention contemplates a flow indicator, which is highly sensitive to slow flows or small pressure differences, and which is attached for observation to two points on the lead sheath located within a manhole as far apart as possible.

The invention further contemplates the method of locating a leak according to which the flow in a cable section is observed by means of a directional flow indicator, in successive manholes along the section until two holes have been reached in which the directions of flow are opposed thereby locating the leak as being in that part of the cable section which lies between those two manholes.

In accordance with a feature of the invention the flow indicator comprises a shunt path for that portion of the cable, which lies between two valves attached thereto in a manhole and includes in this shunt path a chamber for a vapor which is capable of reacting with a reagent visibly located in another portion of the shunt path to be normally out of contact with the vapor; when a pressure difference exists between the valves gas will flow from the cable through the shunt path and will carry the vapor into contact with the reagent which then will be subject to a visible change, as by coloration, provided the flow be in the proper direction.

In accordance with another feature of the invention the indicator is adapted for immediate determination of the direction of the gas flow in the cable by having included in its shunt path two visible deposits of the chemical indicating reagent, one on each side of the vapor container, whereby one or the other indicator will react visibly in accordance with the direction of flow. This arrangement furthermore will permit a check on the observation, since by reversal of the indicator connections to the valves on the cable the other chemical indicator also will react visibly for a given direction of flow in the cable.

In accordance with a preferred form of the invention the flow indicator is adapted for portable use by being of light and simple construction and having flexible connections for attachment, direct and reversed, to the cable sheath; windows are provided in the two branches of the indicator for observation of the visible reactions by the chemical reagent; receptacles, readily removable, are further provided for the chemical indicators as well as for the reactive vapor supply. The chemical indicator is in the form of a deposit of a substance, which may be an acid such as phenolphthalein, on a strip which may be white blotting paper, placed within a glass tube which is open at both ends to form a through passage for the gases; the reactive vapor may be that of a base, such as ammonium hydroxide, absorbed by a wick placed in the vapor chamber.

In accordance with a further feature of the invention the receptacle with the vapor ampoule is inserted in a chamber normally disconnected by valving means from the two chemical indicators, so that it will be placed in communication simultaneously with both branches of the flow indicator.

The general principles of the flow indicator are applicable to flow meters for liquids as well as for gases with the proper choice of chemicals for the visible reaction. As a gas flow indicator the device according to the invention is also applicable for detection of flows in pipes or tubular passages other than cable sheaths. It is also possible to arrange the parts in different ways for the purpose of the invention without a departure from the scope thereof.

The following more detailed description of the invention has reference to the attached drawings in which:

Fig. 1 is a simplified showing of a cable section with a flow indicator attached to two points thereof.

Figs. 2 to 6 are detailed views of a commercially practical embodiment of the invention showing the indicator mounted in a portable box; Fig. 2 is a top view; Fig. 3 is a side view partly in section taken on line 3—3 in Fig. 2; Fig. 4 is a top view of the indicator system proper, partly in section taken on line 4—4 in Fig. 5; Fig. 5 is an end view of the indicator system, partly in section taken on line 5—5 in Fig. 4; and Fig. 6 is a side view of the indicator system partly in section taken on line 6—6 in Fig. 4.

Fig. 7 shows a wick covered ampoule containing a vapor supply, and

Fig. 8 shows a transparent ampoule containing a chemical indicator.

Figure 2:
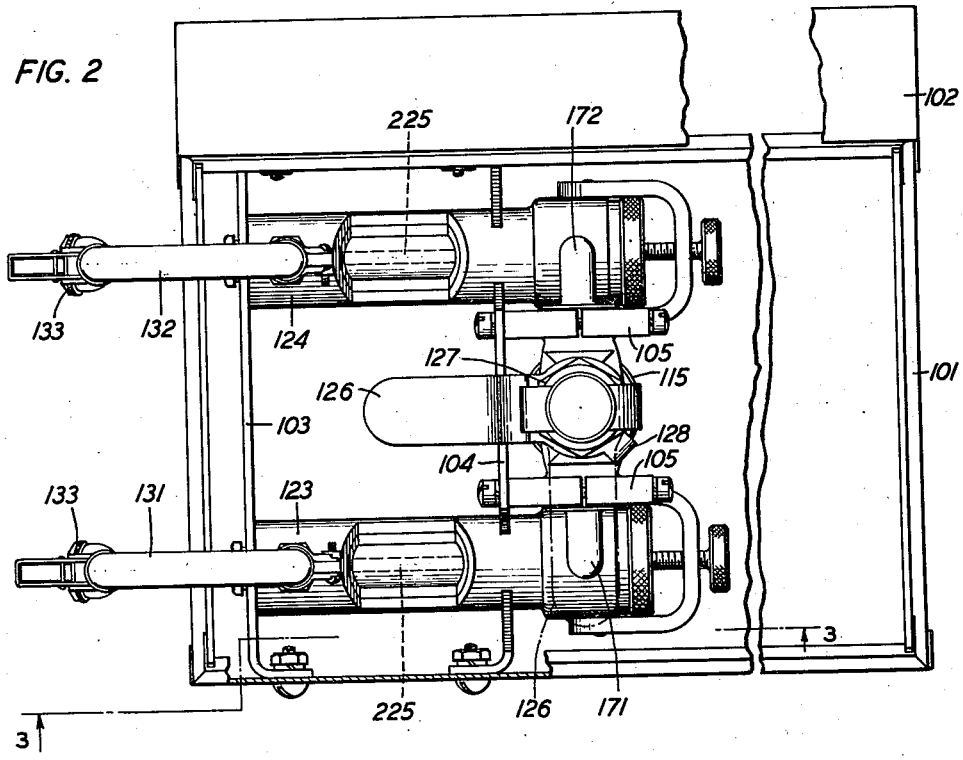
Figure 3:
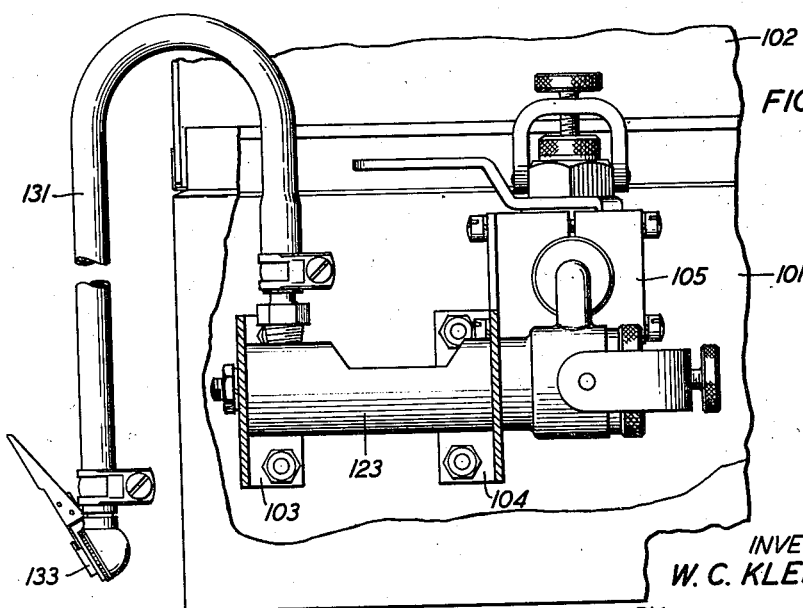

Referring now to the system shown in Fig. 1 the cable portion 10 may be the portion of an underground telephone cable located within a manhole. A cable of this type usually comprises from a few to several hundred signalling conductors each surrounded by a loose wrapping of paper for insulation, which leaves considerable air space between the conductors. The whole bundle of conductors 11 is surrounded by a continuous lead sheath 12 which serves to hermetically seal in the conductors against moisture.

In accordance with present day practice, signalling cables of this type are sectionalized after being placed in the ground each section being long enough to pass through several manholes; adjacent sections are isolated by plugging a few inches of the cable in a manhole, i. e., by completely filling the air spaces within the cable sheath with a low melting point insulating substance for the purpose of preventing gas from passing from one cable section to the other. Each section is then filled with an inert gas, such as nitrogen, through an air valve atached to the sheath, to a pressure of about 12 pounds per square inch, for the purpose of preventing moisture from entering through accidental leaks in the sheath.

At regular intervals inspectors will check the gas pressure in each section to determine the position of leaks as well as their extent. When a leak is considered of sufficient size to warrant repairs of the sheath or replacement of the cable length between two adjacent manholes it becomes necessary to definitely determine between which two manholes, along the whole isolated section, the leak is located.

For this purpose two valves 13 and 14 are attached to the cable sheath in each manhole as far apart as possible for attachment of a flow indicator. By means of the flow indicator the direction of flow in the cable towards the leak is determined successively in different manholes until oppositely directed flows are observed in two adjacent manholes thereby indicating the location of the leak as being between those two manholes.

As shown in Fig. 1 a simple form of the flow indicator embodying the invention comprises a container 20 with two outlets 21 and 22 connected to glass tubes 23 and 24, respectively, which in turn are connected to the valves 13 and 14. The container 20 holds a supply 30 of ammonium hydroxide above which the space will be filled with ammonia vapor surrounding the connections 21 and 22. Each of the glass tubes 23 and 24 contain a strip 25, which may be of white blotting paper with a deposit of phenolphthalein.

Assuming a gas flow in the cable in the direction indicated by the arrows, the pressure gradient between the valves 13 and 14 due to this flow would cause a by-flow of the nitrogen gas from the cable through the indicator thereby driving ammonia vapor from the container 20 through the connection 21 into contact with the strip 25 in tube 23. As is well known phenolphthalein, which ordinarily is colorless, and ammonia, when mixed together, will form a salt of a distinct pink color. Observation of this coloration in the tube 23 would indicate to the inspector that the flow in the cable is in the direction of that tube from container 20. When under reversed conditions the coloration is observed in glass tube 24, this would be an indication of a gas flow in the cable in the opposite direction. Having observed the coloration in tube 23 under the conditions shown in Fig. 1, the inspector may reverse the connections so that glass tube 24 would be connected to valve 13 and glass tube 23 be connected to valve 14. If now the strip 25 in tube 24 is observed to color, the inspector would have a check on his first observation.

The preferred embodiment of the invention, shown in greater detail in Figs. 2 to 8, comprises a practical arrangement adapted for field use.

The indicator system of this embodiment is mounted within a box 101 having a cover 102 and is fastened to the box by means of cross pieces 103 and 104.

The indicator system comprises a double gated valve 115 located between two window mountings 123 and 124. Flexible connections 131 and 132 with suitable self-closing caps 133 serve for connection of the system to valves on the cable, such as valves 13 and 14 in Fig. 1.

The valve 115, as shown more in detail in Figs. 4 and 5, comprises the movable valve body 116, hollowed out to form a chamber 120, a housing 117 having connecting passages 121 and 122 and a screw plug 118 for positioning of the valve member 116 in the housing 117. The valve housing is fastened to the bracket 104 by means of the clamps 105.

The valve body 116 has a handle 126 clamped into position by a nut 127, the handle carrying a stop arm 128 for engagement with the valve housing in the closed position of the valve, as shown in Fig. 2, or in the open position, as indicated by the dot and dash outline of the handle of Fig. 2. Two ports 129 in the wall of the valve body 116 are aligned with the handle 126 and serve for communication between the central chamber 120 and the passages 121 and 122, respectively.

As shown in Fig. 6, the nut 127 on the valve body 116 has a yoke 140 pivotally fastened to it by means of two pins 141. The yoke carries an end screw 142. In the center of the nut 127 is located a circular insert 143 having a hollow center in which is inserted a small tube 144. The insert or plug 143 also has a gasket 145 for gas tight engagement with a shoulder 146 on the valve body 116. The arrangement is such that with the insert 143 in position, as shown in the drawings, the end screw 142 engages the insert 143 and may be tightened to secure the latter in place; however, when the system is to be made ready for use screw 142 will be screwed back and the yoke 140 swung to the side to permit the removal of insert 143 including tube 144.

The window mountings 123 and 124 are alike and each comprises an outer housing 150 in the form of a short circular tube having on its upper side a carved out portion 151. A glass tube 152 is placed inside the opening 151 and is packed against escape of gas through this opening by means of gaskets 153, spacer tube 154 and washers 155. The circular nut 156 serves to tighten these elements together against the shoulder 157. The right-hand end of mountings 123 and 124, as viewed in Figs. 4 and 6, are slightly enlarged and their interiors communicate through tubes 171 and 172 with the passages 121 and 122, respectively. The left-hand ends of mountings 123 and 124 are closed and are adapted for fastening to crosspiece 103 by means of screws and nuts 158; nipples 159 are also fastened at this end of the mounting for attachment of the flexible tubes 131 and 132.

As shown in Fig. 4, the right-hand enlarged portion of each of the housings 150 carries a yoke 160 pivoted on pins 161 and carrying an end screw 162. A circular insert 163 is adapted to fit snugly into the enlarged portion of housing 150 and to be held in position by end screw 162, escape of gas being prevented by a gasket 165. The insert 163 has a hollow center for a gasket 166 and a short tube 164 screwed into position in insert 163. The hollowed out center of insert 163 communicates through drilled holes 167 with a circumferential groove 168 in the outer surface of the insert 163, the groove 168 being opposite the tube connection 171 to the valve chamber when the insert 163 is tightened in position.

When the system is prepared for use the screws 162 on mountings 123 and 124 are loosened and the yokes 160 turned aside to permit the removal of inserts 163 with their tubes 164. On replacement of the inserts 163 the yoke 160 is turned back and screw 162 tightened up.

The ammonia supply for this outfit is in the form of ammonium hydroxide contained in an ampoule 200, such as that shown in Fig. 7, which comprises a glass tube 201, closed at both ends and thin enough to be easily broken. The tube is surrounded with a webbing 202, tied in place, which serves as a wick and absorbs the liquid when the tube is broken.

The chemical indicator is also supplied in an ampoule 210, such as shown in Fig. 8, which comprises a glass tube closed at both ends and containing a strip 225 preferably of white blotting paper soaked with phenolphthalein; a stria at each end of the tube permits easy breaking off of both sealed ends. With the ends broken off the ampoule 210 is placed in the insert 163 by insertion into tube 164 and gasket 166, into which it fits snugly, and the open end of the ampoule will then communicate with the passages 167 of the insert 163.

The preparation of this outfit for a test may be accomplished in a couple of minutes. The box 101 contains a supply of the ampoules 200 and 210; ampoule 200 is broken open, permitting the liquid to soak the wick and is placed in the guide tube 144 of insert 143. This unit then is inserted in the valve 115 and tightened in place by screw 142. The valve is in the closed position and chamber 120 is quickly filled with ammonia vapor.

Two ampoules 210 are then broken at both ends and placed in the plugs 163, inserted in the mountings 123 and 124 and tightened in place by screws 162. The two connections 131 and 132 are then clipped onto the two valves 13 and 14 on the cable in the manhole. The outfit is then ready for use and valve 115 may be opened.

The circuit over which the nitrogen from the cable passes through the indicator system may be traced as follows: From valve 14 through clip 133, flexible connection 132 to mounting 124, through the glass tube of ampoule 210, drilled holes 167, tube connection 172, valve passage 122, chamber 120; ammonia gas is picked up here by the nitrogen gas and carried along through valve passage 121 through tube connection 171, drilled holes 167 into the glass tube of ampoule 210, mounting 123 where the ammonia vapor will react with the phenolphthalein deposit on the indicator strip 225; the gas mixture continues through flexible connection 131, clip 133 and valve 13 on the cable. With this direction of flow the strip 225 in mounting 123 will turn red which may be observed through the window 151; the strip 225 in mounting 124 will be observed to remain white.

If desired the observation may be checked by interchanging the flexible connections 131 and 132 to the valves 13 and 14 thereby reversing the direction of flow through the indicator system and causing ammonia gas to pass from the chamber 120 into contact with the indicator strip 225 in mounting 124 which then also will turn red.

Upon completion of an observation the valve 115 is closed and the three ampoules may quickly be removed and discarded, and a new set inserted for an observation to be taken in another manhole. The flexible connections 131 and 132, when disconnected from the cable, are folded into the box 101 which then is closed and is ready for transportation to the next manhole.

Depending upon the amount of leakage in the cable sheath under observation, and therefore upon the pressure difference between valves 13 and 14, the time of an observation will vary from a few seconds to about half an hour.

The present indicator is extremely sensitive to pressure differences between the points of attachment. Thus in the case of a cable sheath with a leak so minute that a soap bubble of the approximate size of a pea would take 15 minutes to form over the leak, the device definitely indicated the flow within 15 minutes. In this connection it may be stated that when the valve 115 is opened the valve chamber 120 will be filled with ammonia gas and the indicating tubes 210 will be filled with the vapor of phenolphthalein, and that a slow diffusion will take place, even in the absence of a pressure difference, which, perhaps in 2 hours would cause a distinct coloration to take place; it may thus be seen, that only a slight pressure difference need be applied to the system to retard diffusion in one direction and thus advance the coloration in one indicator with respect to the coloration in the other thereby giving a definite indication of the direction of the flow within a reasonable time. When desired the sensitiveness of the system may readily be reduced by well known means for reducing the free infiltration of the two gases within the indicators.

It has been found in practice that experienced operators may draw conclusions from comparative observations of the time required for observable colorations to take place, or of the degree of colorations in a given time, as to which of two manholes on the same side of the leak is nearer to the leak or even what is the approximate location of the leak between two manholes.

What is claimed is:

1. A flow indicating device comprising a tubular conduit, a visible chemical indicator in one part of said conduit, and a supply of reactive fluid in another part of said conduit and normally out of contact with said indicator, said fluid being visibly reactive with said indicator when admitted into contact therewith by admission to said conduit of the flow to be observed.

2. A flow indicating device for a tubular passage for fluid media comprising a conduit adapted to form a by-path for a portion of said passage, an indicator substance in said path normally surrounded by a non-reactive fluid, a supply of reactive fluid normally reposing in said path and instrumentalities included in said path for admitting said reactive fluid to at least partly replace said non-reactive fluid about said indicator in response to pressure difference over said portion due to a flow therein, said indicator substance being observably modified by contact with said reactive fluid.

3. A flow indicator comprising a tubular conduit, a chemical reagent visibly placed in a part of said conduit, a supply of reactive vapor normally reposing in another part of said conduit out of contact with said reagent, and connections for said conduit to a source of fluid pressure difference for admitting said vapor into contact with said reagent, said vapor and said reagent being of such compositions as will give a visible reaction when contacting with each other.

4. A flow indicator in accordance with claim 3 in which said reactive vapor is a base and said chemical reagent is an acid distinctly changing its color in reaction with said base.

5. A flow indicator in accordance with claim 3 in which said reactive vapor is ammonia and said chemical reagent is phenolphthalein.

6. A gas flow indicating device comprising a conduit forming a flow circuit, a chamber included in said circuit, a supply of reactive gas contained in said chamber, instrumentalities included in said circuit adapted for observation of the direction of gas flow therethrough, a deposit of a chemical reagent placed within said instrumentalities, said reagent being normally out of contact with and visibly responsive to contact with said reactive gas, as by coloration, and connecting means for attachment of said conduit to a source of fluid pressure difference for admitting said gas into contact with said reagent.

7. A gas flow indicator system comprising a conduit forming a flow circuit, a chamber included in said circuit, a wick in said chamber and containing a deposit of a chemical vapor solution, such as ammonium hydroxide, instrumentalities included in said circuit having a window for observation of the flow direction therethrough, an indicator in said instrumentalities containing a deposit of chemical reagent, such as phenolphthalein, visibly responsive to contact with the vapor from said solution, as by coloration, but normally out of contact with said vapor, and connecting means for attachment of said conduit to a source of gas pressure for driving said vapor into contact with said reagent.

8. A gas flow indicator system in accordance with claim 7 in which said chamber and instrumentalities each includes a detachable plug adapted to receive the corresponding deposits for ready insertion thereinto.

9. A gas flow indicator system in accordance with claim 7 which includes a double valve for controlling the through passage of said circuit through said chamber.

10. An indicator system for a tubular passage for fluid media having longitudinally separated points of access to its interior, said system comprising a double indicating device containing a chemical reagent, a supply of reactive fluid connected to the midpoint of said double indicating device and initially out of contact with said reagent, and connecting leads from the ends of said double indicating device for attachment to said two points for impressing on said system pressure differences due to a flow in either direction through said passage to admit said reactive fluid into contact with the chemical reagent in one or the other part of said double indicator for visible reaction therewith, thereby indicating the direction of flow.

11. A flow indicator comprising a conduit forming a flow circuit having two branches, a chamber connected between said branches, a reactive fluid contained in said chamber, a deposit of a chemical reagent in each of said branches separated from said fluid, said reagent being visibly reactive to contact with said fluid, connecting means for attachment of said branches to a source of fluid pressure difference, and instrumentalities in each of said branches for observation of the reaction with one or the other of said deposits to contact with said fluid in accordance with the direction of said pressure difference relative to said chamber.

12. A gas flow indicator comprising a chamber containing a reactive vapor, two conduits oppositely directed from said chamber, an indicator window in each of said conduits, a chemical reagent placed within each of said windows, connecting means for said conduits for attachment to a source of gas pressures and valving means for completing the series circuit through said chamber, conduits and connecting means, said chemical reagent being initially out of contact with said vapor and being reactive to contact with said vapor upon completion of said series circuit to acquire a visible change observable through one of said windows in accordance with the direction of the pressure difference of said source at the points of attachment of said connecting means.

13. A leakage testing system for lead covered telephone cables comprising pluggings at both ends of a section of lead covered telephone cable for isolation of said section from adjacent sections of cable, said cable section containing a gas, such as nitrogen, under pressure, two gas valves attached a few, about 6 to 12, feet apart to said cable section for communication with the interior of the lead covering, a gas flow indicator having connections for attachment to said valves and adapted to form a continuous gas circuit between said valves and to receive a flow in either direction of said gas due to pressure difference between the two points of attachment of said valves, said indicator including in its gas circuit a chamber containing a supply of ammonia vapor, two holders each with a deposit of phenolphthalein and placed on opposite sides of said chamber, a window for each of said holders for observation of said deposits and double valving means for simultaneously establishing communication between said chamber and both of said holders to complete said gas circuit and admit ammonia vapor to either one of said holders by said pressure difference and in accordance with its direction for visible coloration of said deposit, thereby indicating the direction of flow in said telephone cable section in case of a leak therein, as through its lead covering.

14. A method of determining a gas leak in a cable having an air-tight sheath containing an inert gas under pressure which comprises applying the pressure difference between two separated points on said cable to a gas circuit containing a chemical indicator, thereby admitting a vapor reactive with said indicator and separately located in said circuit into contact with said chemical indicator to produce a visible reaction therewith, as by coloration, and observing said reaction.

15. A method of locating a leak in an underground length of a multi-conductor cable having a hermetic sheathing enclosing conductors partly mutually insulated by air spaces which comprises sectionalizing said length by plugging of said air spaces, filling a section with an inert gas under pressure, connecting a by-path for gas to two points on the sheathing on said section, admitting said gas to said path to drive a reactive vapor from one part of said path into contact with one or the other of two deposits of a chemical reagent, visibly reactive to said vapor and separately located in said path on opposite sides of said one part, and observing the visible reaction of said vapor with one of said deposits, thereby determining the direction of flow in said section in case of a leak in its sheathing.

16. A method of locating a leak in an underground section of a multi-conductor lead sheathed cable plugged at both ends and filled with an inert gas under pressure which comprises developing a reactive vapor, such as ammonia, in a gas circuit at a point between two deposits of a chemical indicator, such as phenolphthalein, serially included in said circuit, applying to the said gas circuit the pressure difference between two separated points on said cable section located in a manhole to drive said vapor into contact with one or the other of said deposits to produce a coloration thereon, thereby making the direction of flow in said cable section visibly observable.

17. A leakage testing system for gas filled sheathed telephone cables which comprises pluggings for sectionalizing a cable, normally closed gas valves attached to a section of the sheathed cable at points longitudinally separated to be at different pressures in case of a gas flow in said cable, a gas flow indicator adapted for attachment to two of said valves and forming a gas circuit adapted to receive a shunt flow between said two valves, said indicator including a supply of reactive vapor normally at rest in one part of said gas circuit but movable along said circuit with said shunt flow upon completion of said gas circuit, and an indicating substance in another part of said gas circuit normally out of contact with said vapor, said indicating substance being visibly reacted upon by contact with said vapor, thereby indicating the presence of a gas flow in said cable.

WALTER C. KLEINFELDER.